United States Patent [19]

Fisher

[11] 4,108,290

[45] Aug. 22, 1978

[54] HYDRAULIC TORQUE CONVERTER LOCK-UP CLUTCH

[75] Inventor: Walter Fisher, Mount Prospect, Ill.

[73] Assignee: Borg-Warner Corporation, Chicago, Ill.

[21] Appl. No.: 741,258

[22] Filed: Nov. 12, 1976

[51] Int. Cl.² .............................................. F16H 41/18
[52] U.S. Cl. ................. 192/3.3; 137/625.21; 60/361
[58] Field of Search ....................... 192/3.3, 3.29, 56 F

[56] References Cited

U.S. PATENT DOCUMENTS

| | | | |
|---|---|---|---|
| 2,480,933 | 9/1949 | Jandasek | 192/3.3 |
| 2,568,007 | 9/1951 | Jandasek | 192/3.3 |
| 2,597,921 | 5/1952 | Churchill et al. | 192/3.3 X |
| 2,607,456 | 8/1952 | Jandasek | 192/56 F |
| 3,482,669 | 12/1969 | Pegg | 192/56 F |
| 3,566,998 | 3/1971 | Hattori et al. | 192/3.3 |

Primary Examiner—Benjamin W. Wyche
Attorney, Agent, or Firm—James A. Geppert

[57] ABSTRACT

A controlled lock-up clutch interposed between the impeller and turbine in a torque converter of an automatic transmission for an automotive vehicle where the clutch lock-up and unlock is controlled at a torque converter speed ratio design point by the stator movement and loading. A lock-up clutch is actuated from a hydraulic source and controlled by a rotary valve that is actuated by a one-way overrunning clutch positioned between the stator of the torque converter and the rotary valve movable between two control positions.

3 Claims, 3 Drawing Figures

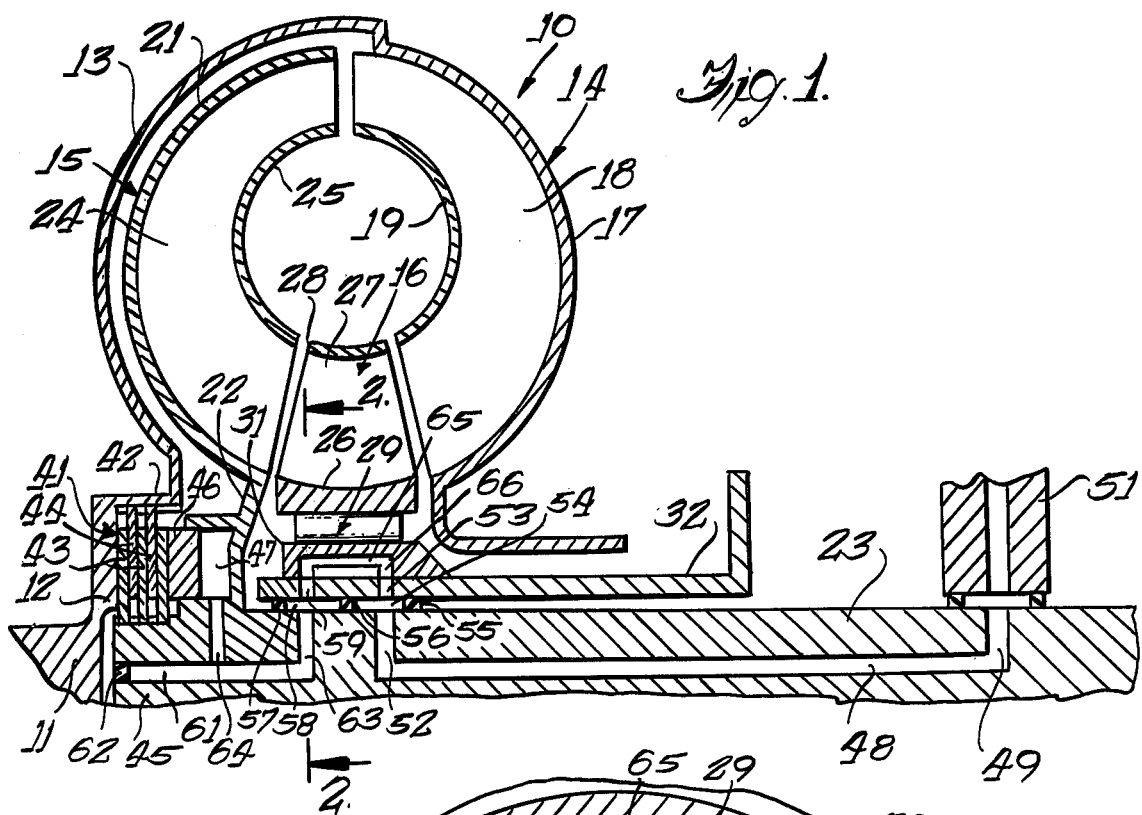

HYDRAULIC TORQUE CONVERTER LOCK-UP CLUTCH

BACKGROUND AND SUMMARY OF THE INVENTION

In automotive transmissions employing hydrodynamic drive devices, either of the fluid coupling type or the torque converter type, use has been made of lock-up clutches for so locking the drive shaft to the driven shaft as to afford a direct mechanical drive in which the action of the hydrodynamic drive device is effectively bypassed. Various types of lock-up clutches have been employed with varying degrees of success.

Such lock-up clutches generally require some type of selector valve or control valve system to actuate engagement of the clutch during operation of the torque converter. Such a system may utilize a manually controlled selector valve including a direct drive clutch valve for actuation of the direct drive or lock-up clutch. Other control systems are known for automatically operating a fluid actuated clutch in which clutch engagement is controlled by a variable pressure derived from the rotational speed of a vehicle engine and the torque load applied to such an engine so that a regulated rate of pressure can be produced for operating the clutch. However, these systems are generally complicated in arrangement and operation and most do not provide a satisfactory control system whereby all valves cooperate in a simple and satisfactory manner to produce an automatic control system for operating a lock-up clutch. The present invention obviates many of the problems of prior clutch control in a simplified and efficient manner.

The present invention relates to a controlled lock-up clutch for a torque converter in an automotive vehicle that is interposed between the impeller and the turbine of the torque converter for an automatic transmission. The lock-up clutch may be of any conventional design, here shown as a multiplate clutch, and clutch lock-up and unlocking is controlled at a torque converter speed ratio design point by the stator movement and loading.

The present invention also comprehends the provision of a controlled lock-up clutch for a torque converter of a vehicle automatic transmission utilizing a simplified valve system. A two-position rotary valve is mounted on a shaft as an inner race of a one-way clutch, with the outer shell of the stator providing the outer clutch race. When the stator tends to freewheel, the valve is biased into one valve position, whereas when the one-way clutch locks due to the stator force reaction from the converter torque multiplication, the stator and locked one-way clutch act to move the valve to its alternate position.

The present invention further comprehends the provision of a controlled lock-up clutch for an automatic torque converter transmission of an automotive vehicle wherein the direct drive accomplished by the clutch lock-up will provide improved fuel economy and emissions performance as compared with conventional torque converter transmissions without lock-up or with lock-up in third gear only.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWING

FIG. 1 is a partial vertical cross sectional view of a torque converter for an automatic transmission embodying the controlled lock-up clutch of the present invention.

FIG. 2 is an enlarged partial vertical cross sectional view taken on the line 2—2 of FIG. 1 and showing the clutch control valve in the clutch lock-up position.

FIG. 3 is an enlarged partial vertical cross sectional view similar to FIG. 2, but showing the control valve in the unlocked position.

DESCRIPTION OF THE PREFERRED EMBODIMENT

Referring more particularly to the disclosure in the drawing wherein is shown an illustrative embodiment of the present invention, FIG. 1 discloses a torque converter 10 utilized with an automatic transmission (not shown) for an automotive vehicle wherein a drive shaft 11 is driven by the engine of the vehicle and terminates in a radial flange 12 that may be integral with or suitably secured to an outer shell or housing 13. The torque converter 10 comprises an impeller 14, a turbine or runner 15 and a stator 16. The impeller 14 includes an outer semi-toroidal shell 17 having blades 18 fixed therein and an inner semi-toroidal shell 19 in contact with the inner edges of the blades or vanes 18; the shell 17 being affixed at its outer edge to the shell 13.

The turbine or runner 15 includes an outer semi-toroidal shell 21 secured or otherwise fixed to a hub 22 which is operatively connected to a driven shaft 23. Turbine blades or vanes 24 are fixed within the shell 21, and an inner semi-toroidal shell 25 is affixed to the inner edges of the vanes 24. The stator 16 also includes an outer semi-toroidal shell 26 having stator blades 27 fixed thereto and an inner curved or semi-toroidal shell 28 fixed to the inner edges of the blades 27.

A one-way clutch 29, such as a sprag clutch, is positioned between the outer stator shell 26 forming an outer race for the clutch and a two-position annular rotary valve 31 forming an inner race and mounted on a stationary stator shaft 32 mounted in the torque converter assembly. The two-position annular rotary valve 31 is slidably mounted on the shaft 32, the shaft 32 containing the fluid passages for a positive locking means of hydraulic lock-up clutch 41. The stator shaft is provided with an arcuate recess 33 defining a pair of arcuately spaced stops 34 and 35; the rotary valve 31 having a depending lug 36 thereon projecting into the recess 33 to cooperate with the stops 34, 35. A compression spring 37 is received in a recess 38 with the outer and engaging a depression 39 in the lug 36 to bias the rotary valve 31 toward the clutch lock-up position as will be later described.

The lock-up clutch 41 is positioned in an annular housing 42 formed in the radial flange 12 and includes inner and outer clutch plates 43 and 44, respectively; the inner plates 43 being splined to the forward end 45 of the driven shaft 23 and the outer plates 44 being splined to the housing 42. The inner and outer plates are interleaved in conventional fashion and are adapted to be actuated by an annular pressure plate or piston 46 located in an annular pressure chamber 47 formed in the hub 22.

The driven shaft 23 is provided with an axial fluid pressure passage 48 having a radial branch 49 leading to a suitable source 51 of oil pressure, and a second radial branch 52 extending toward the rotary valve 31; the stator shaft 32 having a radial passage 53 therein in communication with branch 52 through an annular chamber 54 formed by a pair of axially spaced sealing rings 55, 56. A third sealing ring 57 forms with ring 56 a second annular chamber 58 communicating with an axially spaced second radial passage 59 in the stator shaft. A short axial passage 61 is formed in the driven shaft axially spaced from the axial passage 48 and extending to the end 45 of the shaft; suitable means 62 closing off the open end of the passage 61. Radial branch 63 extends from the passage 61 to open into the annular chamber 58, and a second radial branch 64 extends from the passage 61 into the hub 22 to open into the pressure chamber 47.

The valve 31 is provided with an axially extending generally U-shaped passage 65 having the downturned opposite ends 66, 66 adapted to communicate with the annular chambers 54, 58 when in alignment with the passages 53, 59 in the stator shaft 32. A radially extending dumping passage 67 arranged circumferentially in the valve is adapted to be radially aligned with the branch 59 in the stator shaft 32 and branch 63 in the shaft 23 communicating with the pressure chamber 47 to dump the oil from the pressure chamber and unlock the clutch 41. The passage 67 opens into the one-way clutch 29 in the torque converter to dump the pressurized oil.

Considering the operation of the lock-up clutch assembly, the clutch 41 is in the unlock position during engine start-up and while the engine is idling. In the position of FIG. 3, the two-position rotary valve 31 has been shifted against the force of the compression spring 37 due to the locking of the one-way clutch 29 so that the depending lug 36 engages the stop 35 on the stationary stator shaft 32. As the engine begins to accelerate, the impeller 14 is rotated and the fluid within the impeller is forced to rotate with it and is subjected to centrifugal force. Circulation begins so that fluid from the impeller adjacent its outer circumference enters the turbine 15 and forces liquid from the turbine adjacent its inner circumference through the stator 16 into the impeller. Reaction to the fluid acting against the vanes 24 causes rotation of the turbine to rotate the driven shaft 23, and, at low speeds, the impact of fluid on the stator blades 27 urges the stator to turn in the direction opposite to rotation of the impeller and turbine to retain the one-way clutch in its locked position against the stationary stator shaft, thus preventing reverse rotation of the stator and the rotary valve remains in the position of FIG. 3.

As the torque converter proceeds through the torque multiplication range, the stator reaction retains the one-way clutch 29 in locked position. When the turbine attains a speed where the output torque drops below the input torque, the torque on the stator reverses and then tends to rotate in the same direction as the impeller and turbine. The one-way clutch 29 now allows the stator to catch up with the turbine and then rotate in synchronism with it at the coupling point. When the torque converter speed ratio is greater than the coupling point and above the engine level design point, the rotary valve is spring-biased to engage the stop 34, disconnect the passage 67, and connect the passage 65 with the pressure source 51 and the pressure chamber 47. Fluid under pressure enters the chamber and urges the piston 46 to the left, as seen in FIG. 1, to cause engagement of the clutch plates 43 and 44 and lock-up the impeller 14 with the turbine 15, resulting in a direct drive from the engine shaft 11 to the driven shaft 23.

Movement of the stator 16 to the unlocked mode from the clutch lock-up mode is permitted by providing a manifold vacuum modulated clutch pressure utilizing a modulating valve upstream of the pressure connections. If the clutch 41 is in the locked mode, the pressure in the clutch is maintained by the manifold vacuum value to be slightly higher than that level required to prevent slip. A lag in the clutch pressure build-up allows the engine torque to mementarily exceed the clutch capacity and permits the clutch to slip, such as which would occur during vehicle acceleration. This clutch slippage allows a speed differential to occur between the impeller and turbine and permits the normal torque converter fluid flow directions and forces to act upon the stator to lock or unlock the control clutch. The control clutch 41 is unlocked in the coast condition when the engine torque, as indicated by manifold vacuum, is below a selected design point to prevent engine stall as the vehicle approaches zero speed and to improve emissions and fuel economy performance.

The controlled clutch transmission concept results in a smaller clutch as compared to a conventional lock-up clutch and therefore has less drag losses. Clutch design requirements are greatly reduced since a smaller speed differential and less torque capacity is required for lock-up, which also reduces horsepower losses and heat dissipation requirements. The advantages of the torque converter are retained during acceleration, and the feel and driveability are likely to be similar to a conventional torque converter transmission.

A fuel economy and emissions performance analysis indicated the following. A controlled clutch providing a lock-up at the coupling point is a good compromise between the best performance obtainable in terms of fuel economy and emissions with either a conventional torque converter transmission without lock-up and a manual transmission. The controlled clutch of the above described type is significantly better than a conventional torque converter transmission with a third gear only type of lock-up. This analysis relies on results based on a driving cycle including idle, acceleration and deceleration for a typical passenger car.

Although the preferred design of clutch locks or unlocks at approximately the coupling point for best clutch sizing, the clutch lock-up can be extended to lower speed ratios by an increase in the spring biasing force acting on the rotary valve, and it is not my desire or intent that the scope or utility of the invention be limited by virtue of the illustrative embodiment.

I claim:

1. A hydraulic lock-up clutch for a torque converter of an automotive vehicle transmission wherein the torque converter includes an impeller operatively connected to an engine input, a turbine operatively connected to an output means, and a stator operatively connected to a stator shaft through a one-way clutch, positive locking means for selectively and drivingly coupling the impeller and turbine to permit the engine input to directly drive said output means and including interleaved clutch plates alternately operatively connected to said engine input and said output means and a hydraulically operated piston actuating said clutch plates, and a two-position rotary valve communicating with said locking means and slidably mounted on the surface of said stator shaft and generally radially aligned with said stator, said rotary valve providing an inner race and said stator providing an outer race for said one-way clutch, an inwardly extending lug on said rotary valve, said stator shaft having a recess receiving said lug and providing a pair of spaced stops therefor, a compression spring having one end engaging said lug and the opposite end engaging a recess in said stator shaft to yieldably bias the rotary valve in one direction of rotation to a first position resulting in lock-up of said clutch plates, said rotary valve having a first passage adapted to communicate with a source of hydraulic pressure and said piston and a second passage adapted to relieve the hydraulic pressure behind said piston, passages being in radial alignment with said one way clutch, said rotary valve being operated by said one-way clutch and actuated by the stator reaction force from the torque converter, torque multiplication.

2. A hydraulic lock-up clutch as set forth in claim 1, in which said rotary valve directly engages clutching elements of said one-way clutch, such that when said one-way clutch free-wheels, said rotary valve is biased by said compression spring, and when said one-way clutch locks due to stator reaction force, said valve is moved by said one-way clutch to the hydraulic clutch unlocked position.

3. A hydrodynamic torque converter unit for the transmission of a vehicle comprising an impeller, a driving shaft having a generally radial flange forming a housing and drivingly connected to said impeller, a turbine received in said housing, torque transmitting means operatively connected to said turbine, and a stator interposed between said impeller and turbine and operatively mounted on a stator shaft, a one-way clutch interposed between said stator and stator shaft, said flange forming an annular chamber adjacent said torque transmitting means, a hub joining said turbine and said torque transmitting means and forming a second annular chamber facing said first mentioned chamber and axially aligned therewith, and hydraulic lock-up clutch means to provide a direct drive between said driving shaft and said torque transmitting means and including a plurality of annular clutch plates received in said first chamber, alternating plates being splined to said flange and said torque transmitting means, and an annular piston positioned in said second chamber and adapted to engage said clutch plates, said second annular chamber forming a pressure chamber behind said piston, and a two-position rotary valve slidably mounted on said stator shaft generally radially aligned with said stator and forming the inner race for the one-way clutch, said stator forming the outer race for said one-way clutch, said rotary valve having a first passage adapted to connect a source of hydraulic pressure with said pressure chamber to actuate said piston and a second passage adapted to dump hydraulic fluid under pressure from said pressure chamber, a radially inwardly extending lug on said rotary valve, said stator shaft having a recess receiving said lug and forming spaced stops to limit movement of said valve, and a compression spring in said recess acting against said lug to bias said rotary valve towards the locked position of said lock-up clutch means, and locking of said one-way clutch due to the stator reaction force from converter torque multiplication moving said rotary valve against the spring to the unlocked position of said lock-up clutch means.

\* \* \* \* \*